United States Patent Office 3,374,327
Patented Mar. 19, 1968

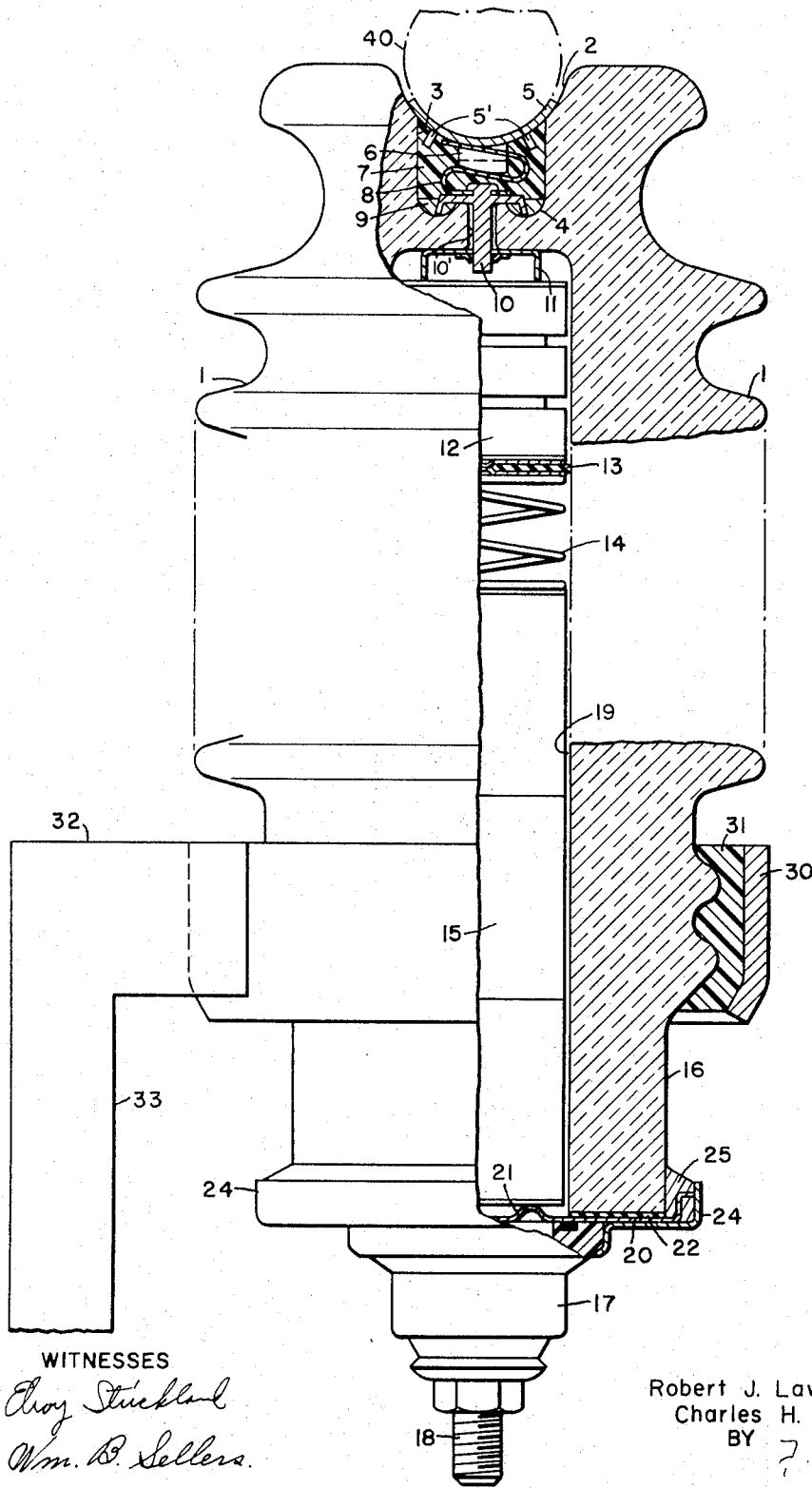

3,374,327
LINE INSULATOR-LIGHTNING ARRESTER
Robert J. Lawrence and Charles H. Carothers, Bloomington, Ind., assignors to Westinghouse Electric Corporation, Pittsburgh, Pa., a corporation of Pennsylvania
Filed Aug. 31, 1965, Ser. No. 484,047
5 Claims. (Cl. 200—115)

ABSTRACT OF THE DISCLOSURE

The invention comprises a combination of a rugged power line insulator and lightning arrester, the lightning arrester being supported inside the insulator. The line connecting end of the insulator is provided with a recess and bore, the recess supporting a concave-shaped electrical terminal for seating the line conductor. The recess is filled with a sealing cement, the cement securing an electrical conductor in the bore, the conductor extending between the arrester inside the insulator and the concave-shaped terminal.

---

The present disclosure relates to a novel combination of a rugged power line insulator and lightning arrester.

Electrical energy is normally transmitted at extremely high voltages in three-phase form to a substation located in the area to be served by a particular transmission line where the voltage is reduced (stepped down) to a somewhat lower order of voltage. From the substation a distribution system carries the reduced electrical energy throughout the service area. At the site of the consumer the electrical energy is again reduced by a distribution transformer to a voltage level directly usable by the consumer.

The conventional distribution systems are of the overhead type in which three primary conductors carry three-phase energy, the conductor being supported on horizontal wooden cross arms mounted adjacent the upper ends of utility poles. The cross arms are usually six to ten feet long, and with a multiplicity of brackets, conductors, insulators and lightning arresters supported thereon, have a cluttered unsightly appearance. This is a decided detriment especially in residential neighborhoods. Utility companies have therefore long sought ways and means for providing more attractive systems for such areas, such as eliminating the cross arms altogether, or by placing the distribution system underground. Underground systems, however, are much more costly to construct than overhead systems. Also, no use is made of the overhead systems left standing with the complete placing of distribution systems underground. It is necessary, therefore, to find ways and means to make overhead distribution systems less cluttered and unsightly, and to accomplish this in an efficient and economical manner.

In view of the foregoing discussion it is apparent that one of the principal objects of the present invention is to provide novel, efficient means directed toward the end of making utility poles and other overhead energy distribution means more tidy and neat in appearance.

Another object of the invention is to reduce, in a simple and inexpensive manner, the number of components supported on the overhead energy distribution structures without hampering the essential functions they separately perform.

Yet another object of the invention is to reduce the number of overhead components, and the cost thereof to the customer, by combining a pin insulator and a distribution arrester in a thick walled rugged, unitary structure designed to withstand the stresses imposed thereon by the weight of a power line and properly weather sealed to protect the arrester supported inside.

Another object of the invention is to provide a unique contact means between a power line and arrester that maintains contact with the line and supports the line under extreme adverse conditions such as high wind and large temperature changes.

Still another object of the invention is to provide a novel contact means between a power line and arrester that protects a seal and eliminates radio interference caused by intermittent static sparking and corona discharge.

A further object of the invention is to provide a novel sealing means designed to protect the arrester in the line insulator from moisture that may cause static sparking and arrester damage.

These and other objects and advantages of the invention will become more apparent upon consideration of the following detailed description along with the accompanying drawing in which:

The sole figure is a vertical side elevation view in partial section of the line insulator-arrester embodying the present invention.

More specifically, the embodiment shown in the single figure comprises a thick walled housing 1 containing arrester spark gap devices 12 and associated nonlinear resistance (valve) block 15 in the center thereof. Though a valve type arrester is representatively shown in the drawing, an expulsion type of arrester would function equally as well in the context of the inventive concept disclosed and described herein. For the purpose of illustration a valve type arrester is shown.

Around the arrester gap devices and valve blocks can be disposed a fireproof liner such as asbestos as shown and described in copending application Ser. No. 261,134, filed Feb. 26, 1963 and assigned to the present assignee, and now U.S. Patent 3,214,634 issued Oct. 26, 1965, the operation and structure of which is fully described therein. Such a liner would take the shape of the gap and valve devices (in most cases cylindrical) and be disposed in space 19 between the gap and valve devices and the inside wall surface of housing 1. The combination of an asbestos liner and a thick walled housing provides a rugged line insulator structure designed to withstand the stress forces imposed thereon by the weight of power lines while simultaneously preventing the explosion and shattering of the housing caused by gas pressure buildup in case of an arrester fault and internal arcing. Such a structure, in combination with a rapid functioning drop out device, insures against the insulator breaking and dropping the line conductor.

The top of housing 1 is provided with a concave recess 2 designed to accommodate a power line contact member 5 taking the form of the concave recess and line conductor 40 (in phantom view) seated therein. Concave or saddle shaped contact member 5 is secured to the top of housing 1 by stud means 6 suitably fixed to the bottom of member 5 and embedded in a suitable bonding material or cement filler 7 disposed in a further recess 3 in the top of housing 1. Moreover, before contact member 5 is secured in the recess, housing 1 is pressure sealed by the application of solder 9 in a circular groove 4 at the bottom of recess 3 and around the top end of terminal pin means 10 having a dish shaped flange seated in circular groove 4 and in solder 9 as shown in cross section. The shank portion of terminal pin 10 is located in a centrally located bore 10' that joins recess 3 with the enlarged elongated open area in housing 1 containing the arrester components. However, as explained above, housing 1 is sealed at its top end by annular solder joint 9 and the dished end portion of pin 10 secured in circular groove 4.

Terminal pin 10 is electrically and mechanically connected to saddle contact member 5 by S-shaped conductor 8 suitably fixed to the underside of the contact member at one end and suitably secured to the top of pin 10 at its other end. Flexible conductor 8 provides and maintains a good electrical contact between member 5 and flanged terminal pin 10 after filler material 7 is disposed in recess 3 so as to completely encase conductor 8, the top end of flanged terminal 10 and solder joint 9.

The bottom side of contact member 5 is provided with lanced sections 5' that are embedded in filler material 7. Member 5 is thus firmly secured in concave recess 2 and relieves loading on solder joint 9 that would otherwise occur with the to and fro movement of line conductor 40 seated in and secured to contact member 5.

Thus, the electrical connectors and conductor in the top assembly of the figure are ruggedly secured in place in firm electrical contact so that separation of the parts is precluded which eliminates the possibility of arcing and sparking which in turn can result in damage to seals and filler materials, and interference in radio and television reception.

Line conductor 40 may be physically secured to the insulator and concave contact 5 by a tie wire (not shown) disposed in the usual manner over conductor 40 and around the narrow neck portion provided at the top of housing 1. Other securing means may of course be used.

Pin terminal means 10 extends into the enlarged central opening in housing 1 and can be secured on its bottom end by push nut or other suitable means. Terminal pin 10 is placed in electrical contact with spark gap devices 12 by a metal spacer 11 also secured to pin 10 by the securing nut. In the figure, three spark gap devices are shown for purposes of illustration. Obviously more or less of said devices may be used as desired.

Beneath spark gap devices 12 is disposed a disc shaped means 13 of resilient insulating material forming a wall between the gap device section and the valve block section containing valve blocks 15, three of which are shown for purposes of illustration.

Immediately beneath wall 13 is a compression spring 14 which yieldingly holds the various members within housing 1 against longitudinal movement while simultaneously maintaining electrical contact between gap devices 12 and valve blocks 15. Blocks 15 are generally non-linear, voltage sensitive resistances designed to pass high surge currents to ground while maintaining a high resistance path to regular line voltages during normal operation.

At the bottom of housing 1 can be secured a quick-acting dropout assembly 17 of a suitable type effective to disconnect a ground lead from the arrester upon failure of the arrester to interrupt power follow current. Dropout assembly 17 supports a threaded ground stud 18 which is connected to a grounded conductive lead (not shown). Thus in order to provide a discharge path for high surge currents, such as caused by lightning striking line 40, and to provide for arresting power follow current, the components stacked from ground stud 18 to line conductor 40 are connected in electrical series and physically fixed together to form a single unit.

On the bottom of housing 1 is disposed a thin metal base plate 20 with a peripheral extension perpendicular to the plane of the base thereof, the purposes of which will be explained hereinafter. Base plate 20 has crimped or raised projections 21 (only one of which is shown) pressing against a metal plate on the bottom side of the last valve block 15. Base plate 20 and crimp portion 21 provide an electrically conductive path between the last valve block and dropout unit 17. Base plate 20 additionally pressure seals the bottom of housing 1 in conjunction with solder material 25 disposed around the lower part of shank portion 16 of housing 1 and in and around cup portions formed by the peripheral extensions of base plate 20 and a cap means 24. Means 24 secures drop-out unit 17 to the bottom of housing 1. Between the bottom face of housing 1 and base plate 20 is an annular gasket 22 held in place by the solder seal. Thus, housing 1 is hermetically sealed at the top and bottom by solder seals 9 and 25 respectively.

Immediately above the shank portion 16 of housing 1 is disposed a support bracket arrangement 30 extending around and cemented to an irregular surface portion of housing 1 by a suitable bonding material 31. Bracket arrangement 30 has a lateral extension 32 and a longitudinal extension 33 suitably designed and dimensioned to secure the housing and arrester unit on top of a utility pole or near the top thereof. The bracket arrangement shown in the figure is given by way of example only, other mounting expedients being within the skill of those experienced in the art. In any case, no cross-arms are needed to support applicants' novel structure on a utility pole.

It should now be apparent from the above description that applicants have provided a unique and efficient means for reducing the number of components on utility poles while simultaneously reducing costs to customers who purchase and use line insulators and distribution arresting devices. Such advantages flow from applicant's unique and novel combination of line insulator and arrester which is further ruggedly designed to prevent the insulator housing from breaking and dropping the line secured thereby. The completely solder sealed housing, the novel line contact assembly in the top end of the housing and the dropout assembly guarantees a surety of operation and ease of maintenance and installation heretofore unavailable in the line insulator-arrester art.

The foregoing description has been presented only to illustrate the principles of the subject matter of this application. For example, it is clear that the novel concepts disclosed herein have application in lightning arresters and line insulators of considerably different structure from that shown in the figure. Accordingly, it is desired that the disclosed subject matter be not limited by the embodiment described, but, rather that it be accorded an interpretation consistent with the scope and spirit of its broad principles.

We claim as our invention:

1. In combination, a ruggedized line insulator supporting a distribution arrester in the longitudinal center thereof, the insulator having a concaved surface, recess and bore in the top center thereof, said recess being filled with a cement and securing an electrical conductor therein, said cement formed to provide a concave face in the top surface electrical contact and support means for receiving a power line conductor, said electrical conductor extending through the bore of the insulator and contacting the centrally disposed arrester.

2. In combination, a hollow pin line insulator supporting a distribution arrester in the longitudinal center thereof, said arrester being hermetically sealed in the insulator, the top end of said insulator having a recess and a bore in the center thereof for supporting a power line receiving means in the recess and an electrical conductor in the bore, said conductor forming a current path from the power line receiving means to the arrester, said recess in said insulator having a solder seal, said arrester having a dropout means secured on the bottom end thereof, a thin metal plate extending across the bottom of said insulator, said insulator being solder sealed at the bottom end thereof around the periphery of the metal plate and dropout means.

3. A sturdy line insulator comprising an elongated tubular housing having a tubular distribution arrester disposed in the longitudinal center of the insulator, a dropout means secured to one end of the insulator, an electrical conductor secured in the other end of the insulator having one end in electrical contact with the arrester and its other end in electrical contact with a power line receiving means secured on the end of the insulator and on a cement filler disposed in the end of the insulator and around the conductor, said filler holding the conductor in firm electrical contact with an arrester terminal and the power line receiving means, said conductor mechanically isolating a solder seal from forces exerted on said power line receiving means.

4. In combination, a line insulator having a thick walled housing supporting a lightning arrester in the longitudinal center thereof, the insulator housing having a recess and a bore in one end thereof and an opening in the other end thereof, said recess filled with a cement and securing an electrical conductor therein, said conductor extending through the bore to contact the arrester via a terminal means, said terminal means being solder sealed therearound to form a hermetical seal, an arrester dropout means secured over the other opening by a metal cap means enclosing said opening, said metal cap means solder sealed to said insulator housing, said solder seal forming a hermetical seal.

5. In combination, an elongated line insulator having a thick walled housing portion supporting an arrester gap device, the housing having a recess and a bore in one end thereof and an opening in the other end thereof, said recess containing an electrical conductor therein, a terminal pin means with one end thereof solder sealed in said recess and mechanically and electrically connected to said electrical conductor, the other end of said terminal pin means in electrical contact with said arrester gap device, said recess filled with a bonding material surrounding said conductor and disposed over said solder seal and the sealed end of said terminal pin means, a quick acting dropout device mounted over the other end of said housing in electrical contact with said arrester gap device, said other end being solder sealed around the outside periphery of said housing adjacent the dropout device.

References Cited
UNITED STATES PATENTS

| | | | |
|---|---|---|---|
| 2,820,869 | 1/1958 | Hedlund et al. | 200—115 |
| 2,824,928 | 2/1958 | Hedlund | 200—115 |
| 3,189,710 | 6/1965 | Lawrence et al. | 317—61 X |
| 3,214,634 | 10/1965 | Osmundsen et al. | 315—36 |

LARAMIE E. ASKIN, *Primary Examiner.*